United States Patent
Nam et al.

(10) Patent No.: US 10,317,723 B2
(45) Date of Patent: Jun. 11, 2019

(54) LIQUID CRYSTAL DISPLAY AND METHOD FOR MANUFACTURING THE SAME

(71) Applicant: Samsung Display Co., Ltd., Yongin-si (KR)

(72) Inventors: Jung Gun Nam, Suwon-si (KR); Gug Rae Jo, Asan-si (KR); Dae-Young Lee, Seoul (KR); Kang Soo Han, Seoul (KR)

(73) Assignee: Samsung Display Co., Ltd, Yongin-si (KR)

( * ) Notice: Subject to any disclaimer, the term of this patent is extended or adjusted under 35 U.S.C. 154(b) by 9 days.

(21) Appl. No.: 14/940,984

(22) Filed: Nov. 13, 2015

(65) Prior Publication Data

US 2016/0299380 A1 Oct. 13, 2016

(30) Foreign Application Priority Data

Apr. 10, 2015 (KR) .......................... 10-2015-0051076

(51) Int. Cl.
*G02F 1/1335* (2006.01)
*G02B 5/30* (2006.01)

(52) U.S. Cl.
CPC ..... *G02F 1/133528* (2013.01); *G02B 5/3058* (2013.01); *G02F 2001/133548* (2013.01)

(58) Field of Classification Search
CPC ... G02F 1/133536; G02F 2001/133548; G02F 1/133528; G02B 5/3058
See application file for complete search history.

(56) References Cited

U.S. PATENT DOCUMENTS

| 6,146,796 A * | 11/2000 | Kim ....................... G02F 1/1362 349/143 |
| 2005/0146720 A1* | 7/2005 | Hansen ................ G02B 27/288 356/370 |
| 2008/0017884 A1* | 1/2008 | Jeong ................ G02F 1/133528 257/203 |
| 2012/0140148 A1* | 6/2012 | Kadowaki ............ G02B 5/3058 349/64 |
| 2012/0168065 A1 | 7/2012 | Kaida et al. |
| 2013/0120698 A1 | 5/2013 | Takakuwa et al. |
| 2013/0153534 A1 | 6/2013 | Resnick et al. |
| 2013/0201557 A1* | 8/2013 | Davis .................... G02B 5/3058 359/486.01 |
| 2016/0313601 A1* | 10/2016 | Nam ................. G02F 1/133528 |

FOREIGN PATENT DOCUMENTS

KR 10-2012-0106923 9/2012
KR 10-2013-0052942 5/2013

* cited by examiner

*Primary Examiner* — Michael H Caley
*Assistant Examiner* — Jonathan Y Jung
(74) *Attorney, Agent, or Firm* — H.C. Park & Associates, PLC

(57) ABSTRACT

Provided is a liquid crystal display including: a first substrate; a wire grid polarizer disposed on the first substrate and including a first region and a second region spaced apart from each other by a stitch line; and a first thin film layer disposed on the wire grid polarizer. The stitch line includes a shape of a curved line or a series of straight lines connected by bends.

10 Claims, 12 Drawing Sheets

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2015-0051076 filed on Apr. 10, 2015, which is hereby incorporated by reference for all purposes as if fully set forth herein.

BACKGROUND

Field

Exemplary embodiments relate to a liquid crystal display and a method of manufacturing the same.

Discussion of the Background

A liquid crystal display, which is one of the most common types of flat panel displays currently in use, generally include two sheets of display panels with field generating electrodes, such as a pixel electrode and a common electrode, disposed on the display panels, and a liquid crystal layer interposed between the display panels, generates an electric field in the liquid crystal layer by applying a voltage to the field generating electrodes, and controls the orientation of liquid crystal molecules in the liquid crystal layer by the generated electric field, thereby controlling the polarization of incident light so as to display images.

In general, the polarization of incident light is adjusted by attaching a polarizer to an outer surface of each of the two sheets of display panels with the field generating electrodes disposed thereon, and the polarizer is an absorptive polarizer that absorbs the remaining light other than intended polarized light rays. Therefore, with the polarizer, very few of the light sources supplying light to the liquid crystal display are used to display an image, so that optical efficiency of the light sources of the liquid crystal display deteriorates.

In order to improve the optical efficiency of the light sources of the liquid crystal display, a wire grid polarizer has been suggested. Particularly, a nano-imprint method with high manufacturing cost and accuracy has been proposed for forming the wire grid polarizer.

Meanwhile, the larger the liquid crystal display is, the larger the wire grid polarizer is, and when a large area wire grid polarizer is formed, a nano-imprint mold also needs to have a large area, so that it is difficult to manufacture the large nano-imprint mold and the manufacturing cost thereof is high. In addition, a method of manufacturing a large wire grid polarizer by repeating a step of forming a small wire grid polarizer using a small area mold several times has been introduced, but a stitch line is generated at a connection part between the small area wire grid polarizers, and light leakage occurs at the connection part, which might be recognized by a LCD display viewer. As a result, a display defect occurs.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display including a large wire grid polarizer and a method of manufacturing the same.

Additional aspects will be set forth in the detailed description which follows, and, in part, will be apparent from the disclosure, or may be learned by practice of the inventive concept.

An exemplary embodiment discloses a liquid crystal display including: a first substrate; a wire grid polarizer disposed on the first substrate and including a first region and a second region spaced apart from each other by a stitch line; and a first thin film layer disposed on the wire grid polarizer. The stitch line includes a shape of a curved line or a series of straight lines connected by bends.

An exemplary embodiment also discloses a method of manufacturing a liquid crystal display, including: forming a metal layer on a first substrate; dropping first resin drops onto a first part of the metal layer; forming first resin patterns by compressing the first resin drops using a mold; dropping second resin drops onto a second part of the metal layer not overlapping the first resin patterns; forming second resin patterns by compressing the second resin drops using the mold; and forming a wire grid polarizer including metal lines by etching the metal layer using the first resin patterns and the second resin patterns as a mask. The wire grid polarizer includes a first region and a second region spaced apart from each other by a stitch line, and the stitch line has a shape of a curved line or a series of straight lines connected by bends.

An exemplary embodiment further discloses a liquid crystal display including: a first substrate; a wire grid polarizer disposed on the first substrate and including a first metal line pattern and a second metal line pattern, the wire grid polarizer being disposed in a pixel; and a thin film layer disposed on the wire grid polarizer. The first metal line pattern is spaced apart from the second metal line pattern to form a gap between the first metal line pattern and the second metal line pattern, and the gap includes a portion corresponding to a bent line or a curved line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
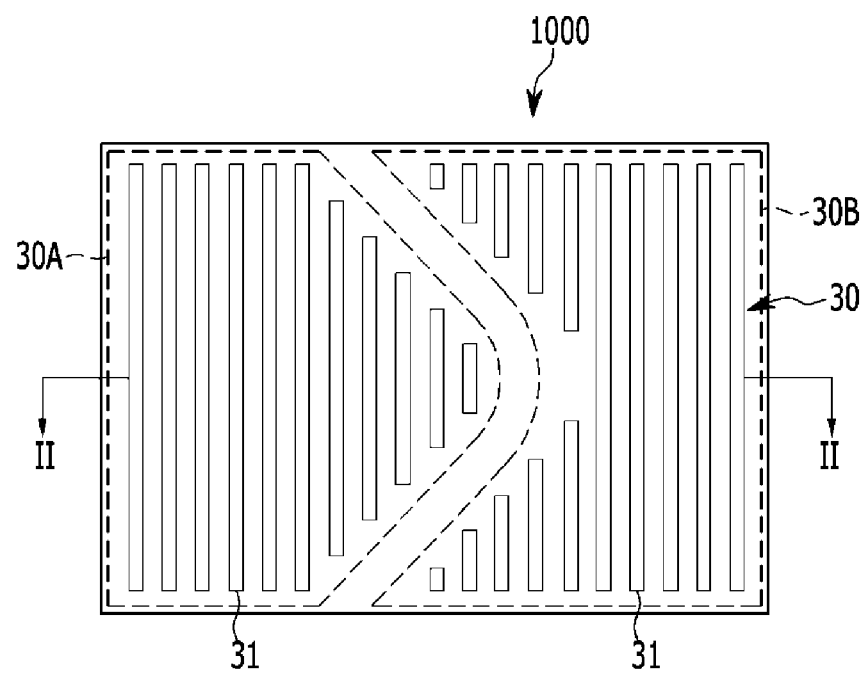
FIG. 1 is a layout view of a liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a liquid crystal display and a method of manufacturing the same according to an exemplary embodiment will be described with reference to the accompanying drawings.

First, a liquid crystal display according to an exemplary embodiment will be described with reference to FIG. 1 and FIG. 2. FIG. 1 is a layout view of a liquid crystal display according to an exemplary embodiment, and FIG. 2 is a cross-sectional view taken along section line II-II of FIG. 1 according to an exemplary embodiment.

Figure 2:
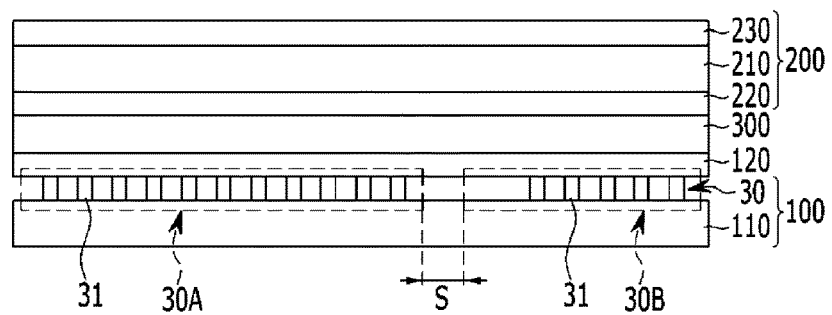
FIG. 2 is a cross-sectional view taken along section line II-II of FIG. 1 according to an exemplary embodiment.

Referring to FIG. 1 and FIG. 2, a liquid crystal display 1000 includes a first display panel 100 and a second display panel 200 facing each other, and a liquid crystal layer 300 interposed between the first and second display panels 100 and 200.

First, the first display panel 100 will be described.

The first display panel 100 includes a first substrate 110, a wire grid polarizer 30 including metal lines 31, and a first thin film layer 120.

The first substrate 110 may include or may be made of transparent glass, plastic, or the like.

The wire grid polarizer 30 is disposed on the first substrate 110, and may include any one of aluminum (Al), gold (Au), silver (Ag), copper (Cu), chromium (Cr), iron (Fe), and the like. Further, the wire grid polarizer 30 may include an alloy of aluminum (Al), gold (Au), silver (Ag), copper (Cu), chromium (Cr), iron (Fe), and the like. The line width of the metal line 31 of the wire grid polarizer 30 may be about 60 nm or less, the interval between two adjacent ones of the metal lines 31 of the wire grid polarizer 30 may be about 120 nm or less, and the entire area of the wire grid polarizer 30 may be 200 mm×200 mm or more.

The wire grid polarizer 30 includes a first region 30A and a second region 30B. In the first region 30A and the second region 30B, the metal lines 31 are disposed to have a predetermined width and a predetermined interval.

Further, the first region 30A is spaced apart from the second region 30B. A region between the first region 30A and the second region 30B is referred to as a stitch line S, and according to an exemplary embodiment, the stitch line S is formed in a curved line shape rather than a straight line. The stitch line S is formed in the curved line shape, so that lengths of the metal lines 31 disposed in the first region 30A and the second region 30B may vary. More specifically, the lengths of the metal lines 31 disposed in the first region 30A and the second region 30B become shorter as the locations thereof are closer to the stitch line S.

According to an exemplary embodiment, the wire grid polarizer 30 may include the first region 30A and the second region 30B, but is not limited thereto, and the wire grid polarizer 30 may further include regions in addition to the first region 30A and the second region 30B. In this case, the regions are spaced apart from each other, and another stitch line S is formed in a curved line shape.

The first thin film layer 120 is disposed on the wire grid polarizer 30. The first thin film layer 120 may include thin film transistors, gate lines, data lines, and pixel electrodes. The thin film transistors may be disposed in a matrix form. A gate line is connected to a gate terminal of a thin film transistor, a data line is a connected to a source terminal of a thin film transistor, and a pixel electrode is connected to a drain terminal of a thin film transistor. The thin film transistors, the gate lines, the data lines, and the pixel electrodes constitute multiple pixels.

Next, the second display panel 200 will be described.

The second display panel 200 may include a second substrate 210, a second thin film layer 220, and a polarizer 230.

The second substrate 210 may include or may be made of transparent glass, plastic, or the like.

The second thin film layer 220 is disposed between the liquid crystal layer 300 and the second substrate 210, and may include a light blocking member, a color filter, and a common electrode. The light blocking member may divide a pixel area, the color filter may be disposed in a region partitioned by the light blocking member, and the common electrode may be disposed on the light blocking member and the color filter.

The polarizer 230 may be disposed on an outer surface of the second substrate 210, but the location is not limited thereto.

In general, compared to a straight stitch line, a curved stitch line S is more blurredly recognized by a viewer, and in the case of the liquid crystal display 1000 according to an exemplary embodiment, the large wire grid polarizer 30 covering relatively a large area than the size of a wire grid mold includes the first region 30A and the second region 30B spaced apart from each other, and the stitch line S, which is a region between the first region 30A and the second region 30B spaced apart from each other, is formed in the curved line shape, which makes it difficult for the viewer of the display to recognize the stitch line S. Accordingly, it is possible to provide a liquid crystal display including the large wire grid polarizer without increasing manufacturing costs.

Hereinafter, a method of manufacturing the liquid crystal display according to an exemplary embodiment will be described with reference to FIG. 3 through FIG. 9, and FIG. 1 and FIG. 2. FIG. 3 through FIG. 9 are diagrams sequentially illustrating a method of manufacturing the liquid crystal display according to an exemplary embodiment.

Figure 3:
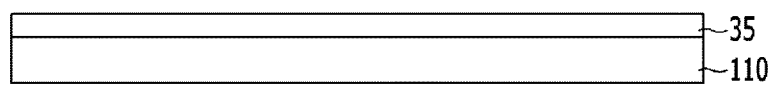
FIG. 3, FIG. 4, FIG. 5, FIG. 6, FIG. 7, FIG. 8, and FIG. 9 are diagrams sequentially illustrating a method of manufacturing a liquid crystal display according to an exemplary embodiment.
Figure 4:
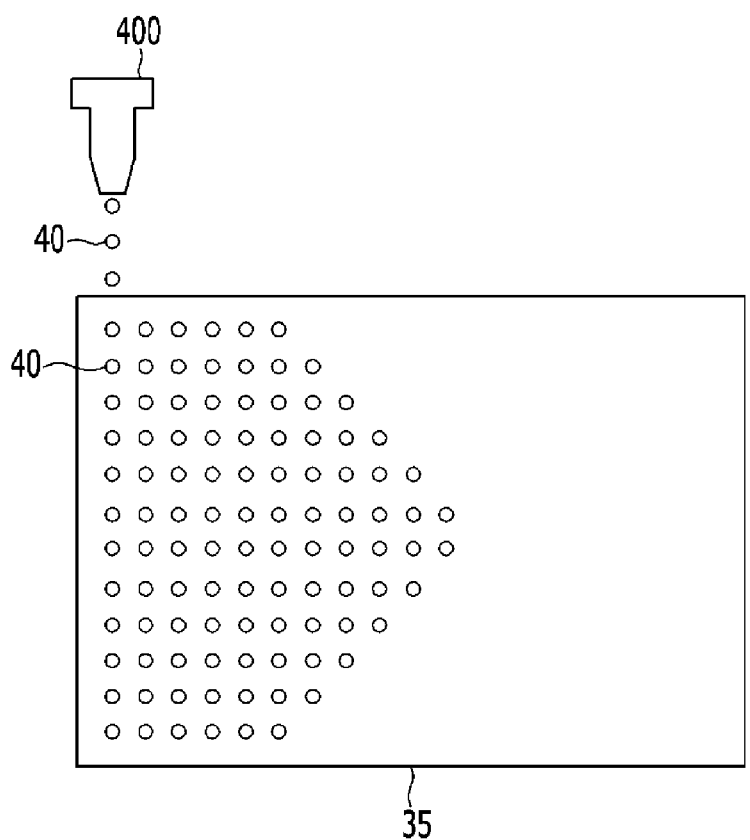

Referring to FIG. 3 and FIG. 4, a metal layer 35 is formed on the first substrate 110, and then resin drops 40 are disposed on the metal layer 35.

The metal layer 35 may include any one of aluminum (Al), gold (Au), silver (Ag), copper (Cu), chromium (Cr), iron (Fe), and the like. Further, the metal layer 35 may include an alloy of aluminum (Al), gold (Au), silver (Ag), copper (Cu), chromium (Cr), iron (Fe), and the like.

The resin drops 40 may be dropped onto the metal layer 35 by using an Inkjet device 400. Here, the resin drops 40 may be dropped onto a part of the metal layer 35, not the entire surface thereof. Further, the resin drops 40 may be dropped at predetermined intervals in a row direction. In addition, the resin drops 40 may be dropped to have different lengths when progressing in a column direction. For example, the lengths in a row direction of the dropped resin drops 40 become shorter when progressing in the column direction.

Figure 5:
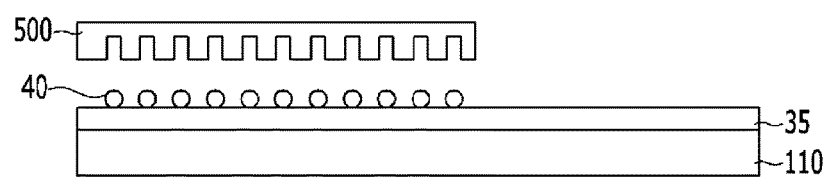
Figure 6:
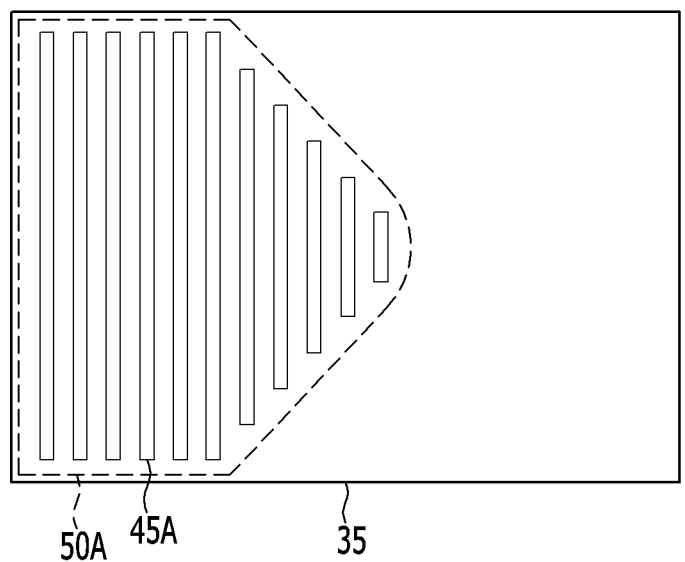

Referring to FIG. 5 and FIG. 6, a first resin pattern region 50A may be formed by performing an imprint method using a mold 500. The size of the mold 500 may be smaller than the entire size of the metal layer 35 in which a wire-grid pattern is to be formed.

When the dropped resin drops 40 are compressed by the mold 500, the resin drops 40 form first resin patterns 45A by grooves of the mold 500. The first resin patterns 45A formed by the mold 500 constitute the first resin pattern region 50A. The lengths of the first resin patterns 45A gradually increases or decreases when progressing in the column direction to form a curved line shape.

Figure 7:
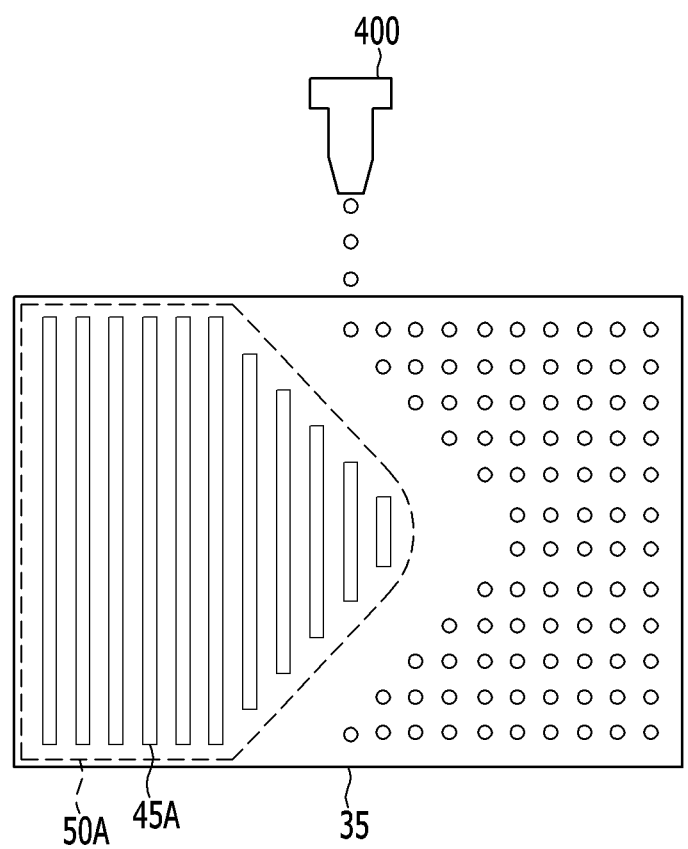
Figure 8:
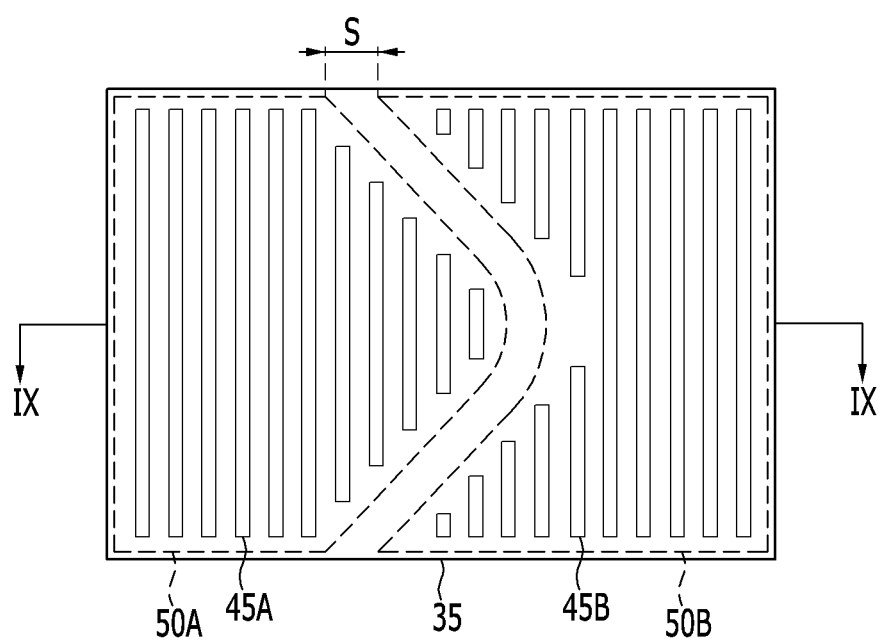
Figure 9:
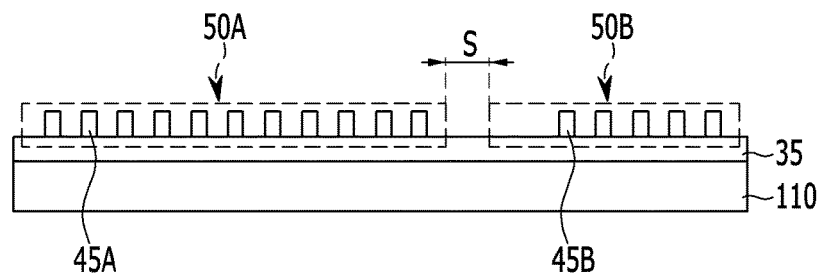

Referring to FIG. 7, FIG. 8, and FIG. 9, onto the metal layer 35 except for the portion where the first resin pattern region 50A is formed, resin drops 40 may be dropped by using the inkjet device 400, and then a second resin pattern region 50B may be formed by performing the imprint method using the mold 500.

At the time of dropping the resin drops 40 onto the metal layer 35 except for the portion where the first resin pattern region 50A is formed, the resin drops 40 are dropped at a predetermined interval from the first resin pattern region 50A.

As illustrated in FIG. 5 and FIG. 8, when the dropped resin drops 40 are compressed by using the mold 500 or a mold has a shape corresponding to the second resin patterns 45B, the resin drops 40 form second resin patterns 45B by grooves of the mold 500. The second resin pattern 45B formed by the mold 500 constitutes the second resin pattern region 50B. The first resin pattern region 50A is spaced apart from the second resin pattern region 50B with a predetermined interval, and the predetermined interval, that is, a stitch line S, is formed in a curved line shape. The lengths of the first resin patterns 45A and the second resin patterns 45B formed in the first resin pattern region 50A and the second resin pattern region 50B, respectively, become shorter as the locations of the first resin patterns 45A and the second resin patterns 45B are closer to the stitch line S.

Further, the first resin patterns 45A may be used as a mask to form a first metal line pattern by an etching process. Portions of the metal layer 35 beneath the first resin patterns 45A may not be etched during the etching process, and thus the first metal line pattern may have substantially the same pattern as the pattern shape of the first resin patterns 45A. Similarly, the second resin patterns 45B may be used as a mask to form a second metal line pattern by an etching process.

Portions of the metal layer 35 beneath the second resin patterns 45B may not be etched during the etching process, and thus the second metal line pattern may have substantially the same pattern as the pattern shape of the second resin patterns 45B. Thus, after the etching process, a wire grid polarizer including the first metal line pattern and the second metal line pattern may be formed. The wire grid polarizer may be disposed in one or more pixel areas, and a gap between the first metal line pattern and the second metal line pattern may correspond to the stitch line S described herein.

As shown in the drawings, e.g., FIG. 8, FIG. 10, FIG. 11, and FIG. 12, the gap includes one or more portions corresponding to a bent line or a curved line. Further, the bent line or the curved line has a direction not parallel to edges of the pixels. Metal lines of the first metal line pattern and the second metal line pattern may have different lengths according to a proximity to the gap.

Referring to FIG. 1 and FIG. 2, after the wire grid polarizer 30 including the metal lines 31 is formed by etching the metal layer 35 using the first resin patterns 45A and the second resin patterns 45B as a mask, a first thin film layer 120 is formed on the wire grid polarizer 30, thereby manufacturing the first display panel 100.

The wire grid polarizer 30 includes the first region 30A and the second region 30B. The first region 30A and the second region 30B are spaced apart from each other. The stitch line S, which is a region between the first region 30A and the second region 30B spaced apart from each other, is formed in the curved line shape.

After the second display panel 200 including the second substrate 210, the second thin film layer 220, and the polarizer 230 is formed, the liquid crystal layer 300 is formed by dropping liquid crystal onto the first display panel 100 or the second display panel 200, and then the first and second display panels 100 and 200 are attached.

Further, after attaching the first and second display panels 100 and 200, the liquid crystal layer 300 may also be formed by injecting liquid crystal between the first and second display panels 100 and 200.

Hereinafter, a liquid crystal display according to an exemplary embodiment will be described with reference to FIG. 10, FIG. 11, and FIG. 12.

Figure 10:
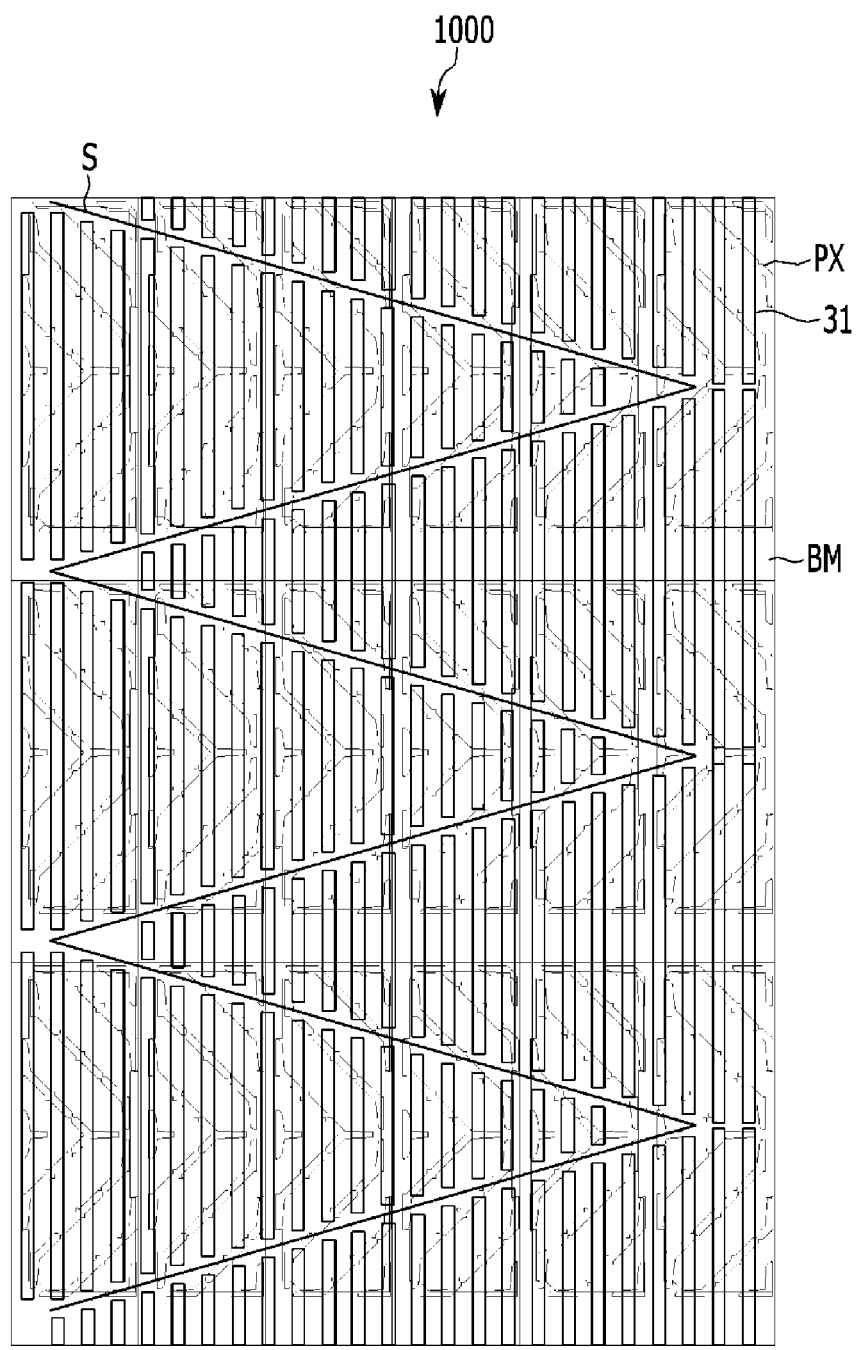
FIG. 10 is a layout view schematically illustrating a liquid crystal display according to an exemplary embodiment.

FIG. 10 is a layout view schematically illustrating a liquid crystal display according to an exemplary embodiment.

Referring to FIG. 10, a liquid crystal display 1000 according to an exemplary embodiment includes a wire grid polarizer including metal lines 31, a light blocking member BM, and multiple pixels PX divided by the light blocking member BM.

The wire grid polarizer may be divided into multiple regions by a stitch line S. In this case, the stitch line S has a shape in which a straight line extends in a diagonal direction to be bent in a zigzag shape, and overlaps the pixels PX and the light blocking member BM (e.g., the stitch line S may correspond to a triangle wave shape or a saw-tooth shape). As described above, the stitch line S overlaps the pixels PX, thereby reducing luminance deviation between the pixels.

Figure 11:
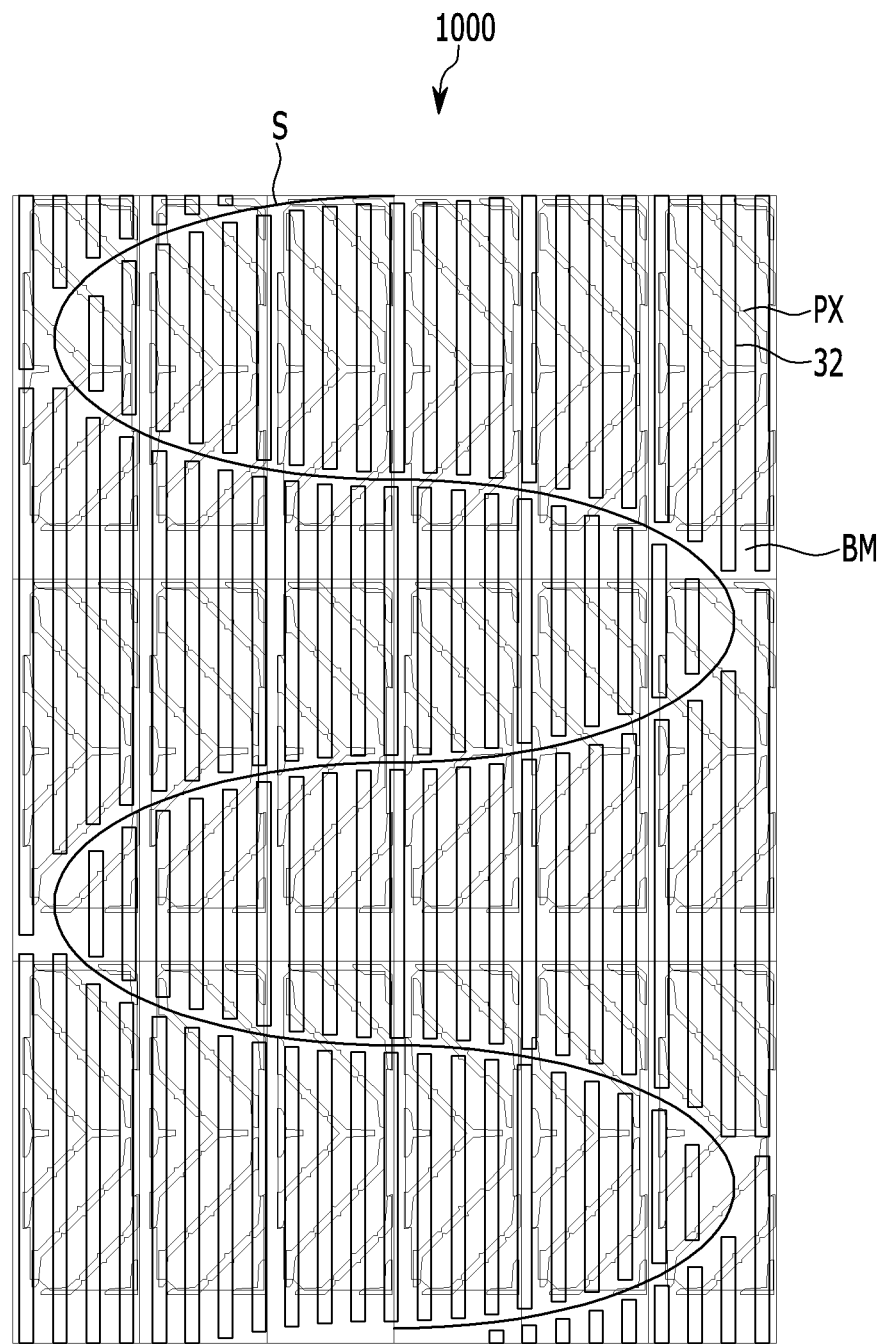
FIG. 11 is a layout view schematically illustrating a liquid crystal display according to an exemplary embodiment.

FIG. 11 is a layout view schematically illustrating a liquid crystal display according to an exemplary embodiment.

Referring to FIG. 11, a liquid crystal display 1000 according to an exemplary embodiment includes a wire grid polarizer including metal lines 32, a light blocking member BM, and pixels PX divided by the light blocking member BM.

The wire grid polarizer may be divided into multiple regions by a stitch line S. In this case, the stitch line S has a curved wave line shape (e.g., the stitch line S may correspond to a sinusoidal wave shape) and overlaps the pixels PX and the light blocking member BM.

Figure 12:
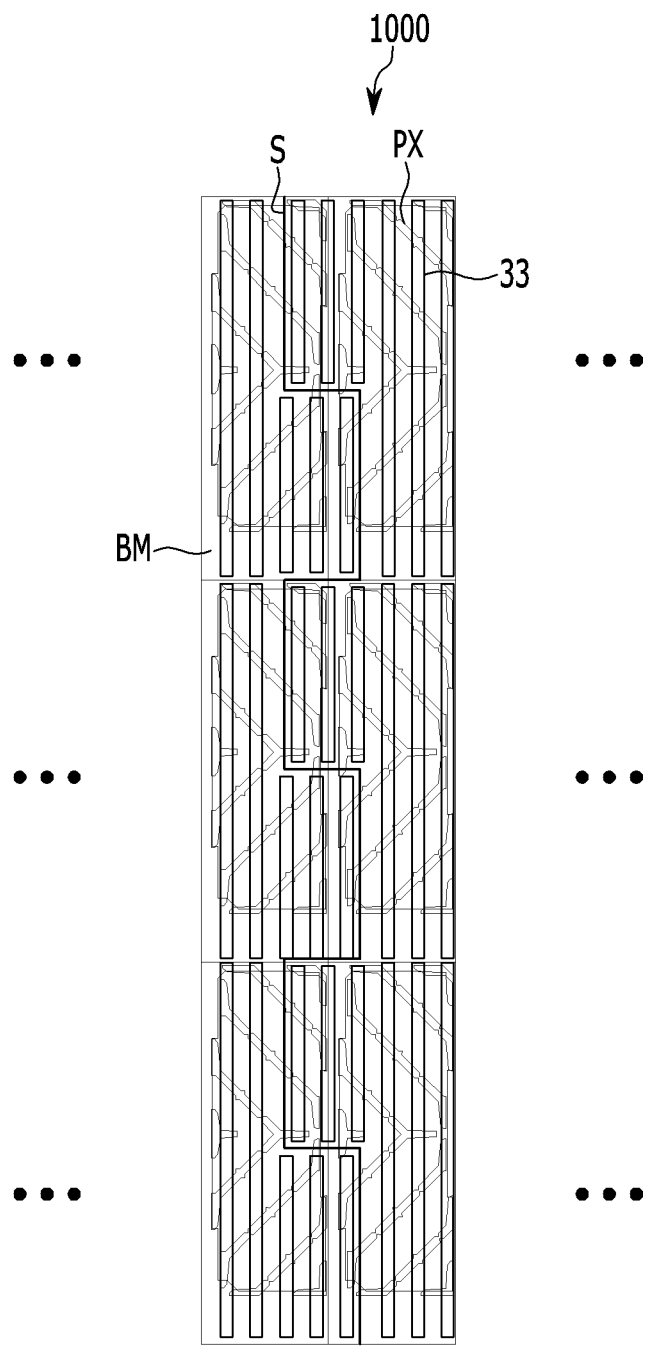
FIG. 12 is a layout view schematically illustrating a liquid crystal display according to an exemplary embodiment.

FIG. 12 is a layout view schematically illustrating a liquid crystal display according to an exemplary embodiment.

Referring to FIG. 12, a liquid crystal display 1000 according to an exemplary embodiment includes a wire grid polarizer including metal lines 33, a light blocking member BM, and multiple pixels PX divided by the light blocking member BM.

The wire grid polarizer may be divided into multiple regions by a stitch line S. In this case, the stitch line S has a shape in which a straight line is bent to include recess portions and convex portions (e.g., the stitch line S corresponds to a square wave shape), and overlaps the pixels PX and the light blocking member BM.

According to an exemplary embodiment, the wire grid polarizer includes the first region and the second region spaced apart from each other by the stitch line, and the stitch line is formed in the curved line shape, which may make it difficult for a viewer to recognize the stitch line. Accordingly, it is possible to provide the liquid crystal display including the large area wire grid polarizer without increasing manufacturing costs.

Moreover, the stitch line overlaps the pixels, thereby reducing a luminance deviation between the pixels.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
   a first substrate comprising a light blocking member and a plurality of pixels divided by the light blocking member;
   a wire grid polarizer disposed on the first substrate and comprising a first region and a second region spaced apart from each other by a stitch line; and
   a first thin film layer disposed on the wire grid polarizer,
   wherein the stitch line comprises a shape of a curved line or a series of straight lines connected by bends,
   wherein the stitch line overlaps the light blocking member and at least three pixels of the plurality of pixels, and
   wherein the stitch line passes through a center portion of at least one pixel of the plurality of pixels.

2. The liquid crystal display of claim 1, wherein the wire grid polarizer comprises metal lines.

3. The liquid crystal display of claim 2, wherein in the first region and the second region, the metal lines are disposed to have a predetermined width and a predetermined interval.

4. The liquid crystal display of claim 3, wherein lengths of the metal lines are different according to a proximity to the stitch line.

5. The liquid crystal display of claim 1, wherein the stitch line has a shape in which a straight line extends in a diagonal direction and is bent in zigzags.

6. The liquid crystal display of claim 1, wherein the stitch line has a shape in which a straight line is bent to form recess portions and convex portions.

7. The liquid crystal display of claim 1, further comprising:
   a second substrate facing the first substrate;
   a liquid crystal layer interposed between the first substrate and the second substrate; and
   a polarizer disposed on a surface of the second substrate.

8. A liquid crystal display comprising:
a first substrate comprising a light blocking member and a plurality of pixels divided by the light blocking member;
a wire grid polarizer disposed on the first substrate and comprising a first metal line pattern and a second metal line pattern, and
a thin film layer disposed on the wire grid polarizer,
wherein the first metal line pattern is spaced apart from the second metal line pattern to form a gap between the first metal line pattern and the second metal line pattern,
wherein the gap comprises a portion corresponding to a bent line or a curved line,
wherein the gap overlaps the light blocking member and at least three pixels of the plurality of pixels, and
wherein the gap passes through a center portion of at least one pixel of the plurality of pixels.

9. The liquid crystal display of claim 8, wherein the bent line or the curved line has a direction not parallel to edges of the pixel.

10. The liquid crystal display of claim 8, wherein metal lines of the first metal line pattern and the second metal line pattern have different lengths according to a proximity to the gap.

\* \* \* \* \*